(12) United States Patent
Cho et al.

(10) Patent No.: US 9,251,786 B2
(45) Date of Patent: Feb. 2, 2016

(54) METHOD, MEDIUM AND APPARATUS FOR PROVIDING MOBILE VOICE WEB SERVICE

(75) Inventors: Jeong-mi Cho, Suwon-si (KR); Ji-yeun Kim, Seoul (KR); Yoon-kyung Song, Seoul (KR); Byung-kwan Kwak, Yongin-si (KR); Nam-hoon Kim, Yongin-si (KR); Ick-sang Han, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 784 days.

(21) Appl. No.: 12/007,797

(22) Filed: Jan. 15, 2008

(65) Prior Publication Data

US 2009/0055179 A1    Feb. 26, 2009

(30) Foreign Application Priority Data

Aug. 24, 2007  (KR) .......................... 10-2007-0085560

(51) Int. Cl.
    *G10L 15/00*    (2013.01)
    *G10L 15/193*   (2013.01)

(52) U.S. Cl.
    CPC .................................... *G10L 15/193* (2013.01)

(58) Field of Classification Search
    None
    See application file for complete search history.

(56) References Cited

U.S. PATENT DOCUMENTS

| | | | |
|---|---|---|---|
| 6,587,822 B2 * | 7/2003 | Brown et al. | ................. 704/275 |
| 6,604,075 B1 * | 8/2003 | Brown et al. | .............. 704/270.1 |
| 7,027,987 B1 | 4/2006 | Franz et al. | |
| 2001/0013001 A1 * | 8/2001 | Brown et al. | ............... 704/270.1 |
| 2002/0069220 A1 * | 6/2002 | Tran | ................................ 707/503 |
| 2002/0087316 A1 * | 7/2002 | Lee et al. | ........................ 704/257 |
| 2002/0099602 A1 * | 7/2002 | Moskowitz et al. | ............. 705/14 |
| 2004/0044657 A1 | 3/2004 | Lee | |
| 2005/0060565 A1 * | 3/2005 | Chebolu et al. | ................ 713/200 |
| 2005/0060580 A1 * | 3/2005 | Chebolu et al. | ................ 713/201 |
| 2005/0060581 A1 * | 3/2005 | Chebolu et al. | ................ 713/201 |
| 2005/0131675 A1 | 6/2005 | Julia et al. | |
| 2005/0203741 A1 * | 9/2005 | Thwing | .......................... 704/254 |
| 2005/0228881 A1 * | 10/2005 | Reasor et al. | .................. 709/224 |
| 2006/0259302 A1 | 11/2006 | Lewis et al. | |
| 2007/0005570 A1 | 1/2007 | Hurst-Hiller et al. | |

(Continued)

FOREIGN PATENT DOCUMENTS

| KR | 1999-015328 | 3/1999 |
|---|---|---|
| KR | 2000-0072482 | 12/2000 |

(Continued)

OTHER PUBLICATIONS

Korean Office Action dated Apr. 22, 2013 and issued in corresponding Korean Patent Application 10-2007-0085560.

(Continued)

*Primary Examiner* — Leonard Saint Cyr
(74) *Attorney, Agent, or Firm* — Staas & Halsey LLP

(57) ABSTRACT

Provided are a method and apparatus for providing a mobile voice web service in a mobile terminal. The method includes analyzing a web history of a user from web search logs of the user and generating a voice access list based on the analysis results, and performing voice recognition by dynamically generating a voice recognition syntax according to the generated voice access list. Accordingly, by limiting syntax required for voice recognition by generating a syntax suitable for a web context of the user, efficient voice recognition, which can be performed in a terminal not a server, can be implemented.

12 Claims, 4 Drawing Sheets

(56) References Cited

U.S. PATENT DOCUMENTS

| | | | | |
|---|---|---|---|---|
| 2007/0294084 | A1* | 12/2007 | Cross et al. | 704/251 |
| 2008/0134042 | A1* | 6/2008 | Jankovich | 715/733 |
| 2008/0162537 | A1* | 7/2008 | Mancini | 707/102 |
| 2008/0275846 | A1* | 11/2008 | Almas | 707/3 |
| 2008/0288492 | A1* | 11/2008 | Gemmell et al. | 707/7 |

FOREIGN PATENT DOCUMENTS

| | | |
|---|---|---|
| KR | 10-2002-0057045 | 7/2002 |
| KR | 2002-0057045 | 7/2002 |
| KR | 10-2004-0032523 | 4/2004 |
| KR | 10-0486030 | 4/2005 |
| KR | 10-0658940 | 12/2006 |

OTHER PUBLICATIONS

Korean Office Action issue in corresponding Korean Application No. 10-2007-0085560; dated Oct. 29, 2013.

* cited by examiner

METHOD, MEDIUM AND APPARATUS FOR PROVIDING MOBILE VOICE WEB SERVICE

CROSS-REFERENCE TO RELATED PATENT APPLICATION

This application claims the benefit of Korean Patent Application No. 10-2007-0085560, filed on Aug. 24, 2007, in the Korean Intellectual Property Office, the disclosure of which is incorporated herein in its entirety by reference.

BACKGROUND OF THE INVENTION

1. Field of the Invention

The present invention relates to a method, medium and apparatus for providing a mobile voice web service, and more particularly, to a method, medium and apparatus for easily and quickly performing a web access, a web navigation, and a web search in a mobile environment using voice.

2. Description of the Related Art

Due to the growth in use of mobile Internet environments, mobile web searching or downloading of content to a mobile terminal via the Internet is being performed with increasing frequency. However, a button input method used in terminals is too inconvenient and slow to input a search word due to miniaturization of buttons. In addition, since web page navigation using direction keys is slow and unbalanced in synchronization between a cursor movement and a button push, it is difficult to achieve efficient web navigation.

In order to make easy a web search in a mobile Internet environment, web search technologies using voice recognition have been developed. A conventional web search using voice suggests a server-client method. The following web access and search technologies using a server-client method have been disclosed.

Korean Patent Application No. 0486030 relates to an Internet site access apparatus and method for a wireless mobile terminal using voice recognition, by which voice input to the wireless mobile terminal is recognized by a voice recognition server and moved to a desired Internet site and a multimedia server maps a voice recognition syntax from a uniform resource locator (URL) transmitted with the input voice and transmits the mapped voice recognition syntax to the voice recognition server.

Korean Patent Publication No. 2000-0087281 relates to an Internet site search method of a wireless mobile terminal using voice recognition, by which the Internet is searched using voice without a separate voice recognition module via a voice recognition server for registering voice data of users, a search word is recognized by means of comparison of registered voice data of a user, and non-registered voice data is patterned using a database (DB) algorithm.

However, according to the technologies described above, even if voice is input to a terminal, voice recognition is performed by a server using a communication network instead of the terminal. Thus, a high-capacity voice recognition engine requiring a large amount of computing resources and syntax is needed, and if a communication network is used for recognizing voice of a user, costs increase due to the use of the communication network, and furthermore, the voice recognition depends on a communication speed and a state of the communication network.

In addition, by applying the same voice recognition model to all users without considering an individual web history of each user, a characteristic of mobile terminals generally used in a personal environment is not reflected.

SUMMARY OF THE INVENTION

The present invention provides a method and apparatus for easily and quickly performing a web search in a mobile environment using voice.

The present invention also provides a method and apparatus for performing a web access, a web navigation, and a web search in a mobile terminal by dynamically generating and managing a voice recognition syntax in the mobile terminal considering a web history of a user.

According to an aspect of the present invention, there is provided a method of providing a voice web service in a mobile terminal, the method comprising: analyzing a web history of a user from web search logs of the user and generating a voice access list based on the analysis results; generating a voice recognition syntax according to the generated voice access list; and generating a web command by matching input voice of the user with the generated voice recognition syntax.

According to another aspect of the present invention, there is provided an apparatus for providing a voice web service in a mobile terminal, the apparatus comprising: a content data management unit analyzing a web history of a user from web search logs of the user and generating a voice access list based on the analysis results; a dynamic syntax generator generating a voice recognition syntax according to the generated voice access list; and a voice analyzer generating a web command by matching input voice of the user with the generated voice recognition syntax.

According to another aspect of the present invention, there is provided a computer readable recording medium storing a computer readable program for executing the method.

Details and modifications of the present invention are disclosed in dependent claims.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will be described in detail by explaining embodiments of the invention with reference to the attached drawings.

Figure 1:
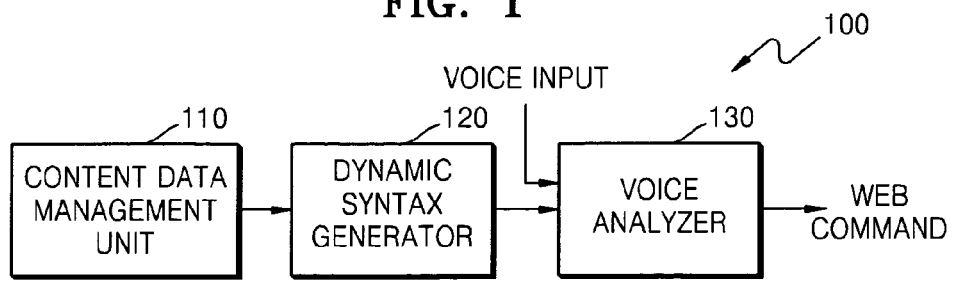
FIG. 1 is a schematic block diagram of an apparatus for providing a voice web service in a mobile terminal, according to an embodiment of the present invention.

FIG. 1 is a schematic block diagram of an apparatus 100 for providing a voice web service in a mobile terminal, according to an embodiment of the present invention.

Referring to FIG. 1, the apparatus 100 for providing a voice web service in a mobile terminal according to the current embodiment of the present invention includes a content data management unit 110, a dynamic syntax generator 120, and a voice analyzer 130.

The apparatus 100 operates in mobile terminals, such as mobile communication terminals, personal digital assistants (PDAs), etc. The apparatus 100 according to the current embodiment of the present invention can recognize voice of a user, directly access a wireless Internet site, and perform a web navigation and a web search.

The content data management unit 110 analyzes a web history of the user from web search logs of the user and generates a voice access list based on the analysis results.

The dynamic syntax generator 120 receives the voice access list from the content data management unit 110 and dynamically generates a voice recognition syntax according to the voice access list.

The voice analyzer 130 receives voice input by the user and generates a web command by matching the user input voice with the voice recognition syntax generated by the dynamic syntax generator 120. The web command includes Uniform Resource Locator (URL) information of a specific site, which is used for directly accessing a web site.

Figure 2:
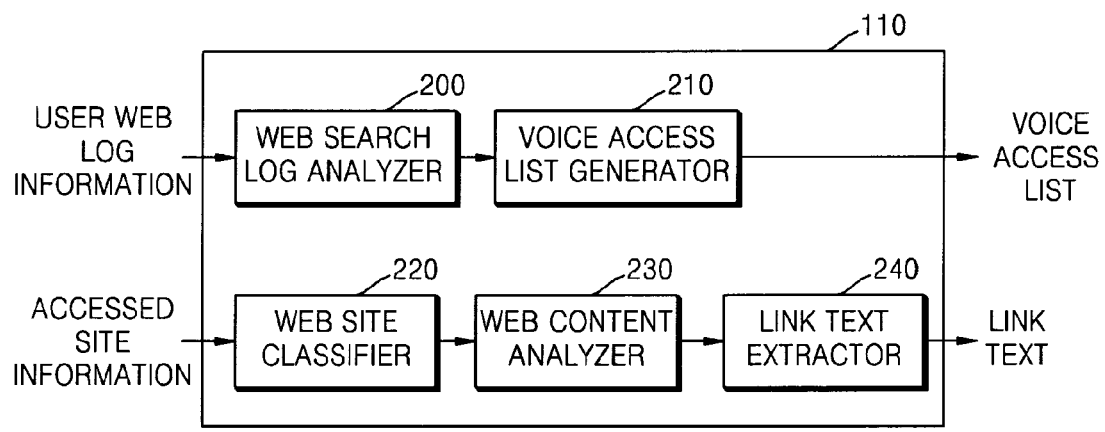
FIG. 2 is a schematic block diagram of a content data management unit of the apparatus illustrated in FIG. 1, according to an embodiment of the present invention.

FIG. 2 is a schematic block diagram of the content data management unit 110 of the apparatus 100 illustrated in FIG. 1, according to an embodiment of the present invention.

Referring to FIG. 2, the content data management unit 110 according to the current embodiment of the present invention can include a web search log analyzer 200 analyzing the number of times the user visits each web site and a web site visit time distribution and a voice access list generator 210 generating a voice access list using results analyzed by the web search log analyzer 200.

In addition to the configuration for directly accessing a web site with voice, as shown in FIG. 2, the content data management unit 110 can further include, for a web navigation and a web search, a web site classifier 220 classifying a field of a site from a URL of the site which the mobile terminal accesses, a web content analyzer 230 analyzing Hypertext Markup Language (HTML) sources of content corresponding to the site which the mobile terminal accesses, and a link text extractor 240 extracting a link text for performing the web navigation and the web search in the site from a result analyzed by the web content analyzer 230.

According to an embodiment of the present invention, the mobile terminal can perform direct web access, web navigation, and a web search with voice. Here, web access denotes access to a specific site through an input of a corresponding URL in an address window of a web browser, and direct web access denotes access to a specific site through dictating a corresponding site name. Web navigation denotes a selection of a link linked to a current page of the web browser with a hypertext, and in an embodiment of the present invention, a link can be selected by dictating a corresponding hypertext. A web search denotes a search of desired information through an input of a corresponding search word in a search window, wherein the search can be performed by inputting a desired search word with voice.

The web search log analyzer 200 generates a voice access list by analyzing user web log information and analyzing sites which the user has visited during a predetermined period. In addition, the web search log analyzer 200 generates a default site list by selecting websites which general users frequently visit, for the direct web access. In addition, the web search log analyzer 200 generates a bookmark list using site information directly registered in a list of favorite sites of the user.

The web search log analyzer 20Q extracts the Internet address and title, access time, and frequency of each site visited by a user from a web history stored in the mobile terminal in order to generate a user visit site list according to the number of times the user visits each web site and a web site visit time distribution. In order to generate the user visit site list, a list is generated in decreasing order from a calculation result of Equations 1 to 3.

An access frequency of a site $s_i$ is calculated using Equation 1.

$$P(s_i) = \frac{F(s_i)}{\sum_j F(s_j)} \quad \text{(Equation 1)}$$

Here, $F(s_i)$ denotes an occurrence frequency of the site $s_i$ in the web history.

An access distribution is calculated using Equation 2.

$$D(s) = \frac{P_{t_i}(s)}{P_{t_{i-1}}(s)} \quad \text{(Equation 2)}$$

Here, $P_t(s)$ denotes P(s) measured at a time t.

A score function obtained according to the access frequency and the access distribution calculated above is represented by Equation 3.

$$\text{Score}(s) = \alpha^* P(s_i) + \beta^* D(s) \quad \text{(Equation 3)}$$

Here, $\alpha^*$ and $\beta^*$ denote weights of the access frequency and the access distribution, respectively.

The user visit site list is generated based on decreasing order of values calculated using Equation 3.

In addition, the voice access list generator 210 may update the voice access list with the default site list and the bookmark list through the user visit site list obtained using Equation 3.

For the web navigation and the web search, the content data management unit 110 may further include the web site classifier 220, the web content analyzer 230, and the link text extractor 240.

In order to support a voice web navigation, link texts, which can be selected by the user with voice, must be extracted from a current page. Each link text can be extracted by analyzing tags of an HTML source of the current page. In an HTML document, each link text is indicated by a tag <A>, and a corresponding URL is indicated by a value of href. Thus, with a simple tag analysis, link texts, which can be selected by the user, and URLs of the link texts can be extracted.

In order to support a voice web search, unlimited voice recognition technology is required, and according to an embodiment of the present invention, the voice web search can be performed by classifying a web page and adding a search word list specified to the classified category to a voice recognition syntax. For example, there are many cases in which the user accesses a shopping site and usually wants a shopping related search, such as a search of products provided by the shopping site, an order, or settlement. Thus, if a current web site corresponds to a shopping category, words pre-defined in association with shopping are added to the voice recognition syntax.

According to an embodiment of the present invention, by analyzing a URL and a title of a corresponding web page, a field of a corresponding web site is classified, and if the current web site is not a field specified site, a favorite search word list is extracted from a portal site. Web site classification categories can include, for example, news, securities, movies, music, shopping, and traveling.

Figure 3:
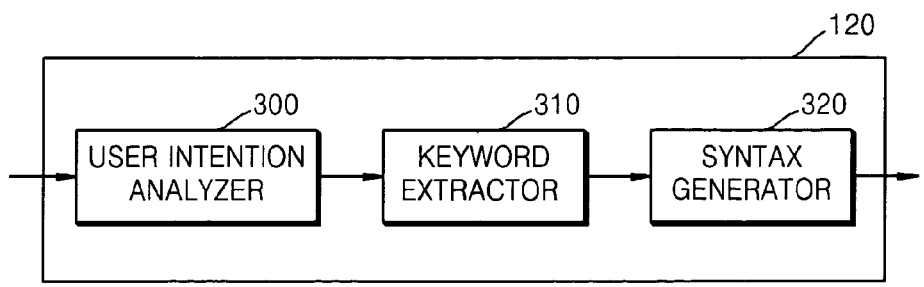
FIG. 3 is a schematic block diagram of a dynamic syntax generator of the apparatus illustrated in FIG. 1, according to an embodiment of the present invention.

FIG. 3 is a schematic block diagram of the dynamic syntax generator 120 of the apparatus 100 illustrated in FIG. 1, according to an embodiment of the present invention.

Referring to FIG. 3, the dynamic syntax generator 120 according to the current embodiment of the present invention dynamically generates a syntax, which is a resource for voice recognition, according to the voice access list generated by the content data management unit 110.

The dynamic syntax generator 120 may include a user intention analyzer 300 analyzing a voice input intention of the user using the site classification result and the extracted link text, a keyword extractor 310 extracting a keyword from the generated voice access list and the extracted link text, and a syntax generator 320 generating a voice recognition syntax according to the user's intention.

The user intention analyzer 300 detects a user's intention of input voice according to a state of the terminal, such as web browser activation, and a site characteristic, such as, a general portal site, a shopping mall site, a securities site, or a movie site. That is, the user intention analyzer 300 dynamically generates a voice recognition syntax according to the user's intention. When the voice recognition syntax is generated according to the user's intention, e.g., a site characteristic, a favorite search word list is generated for a general portal site, and a corresponding search word list is generated for a site specified to a specific field, for example, a search word list related to products in a shopping mall when the site is the shopping mall, a registered company list for a stock list search when the site is a securities site, and a movie title and actor/actress list when the site is a movie site.

A method of analyzing a user's intention will be described with reference to FIG. 4 later.

The keyword extractor 310 removes meaningless symbols from a site list, a link text, and a search word list and extracts user-dictated candidates from the refined text. That is, in order to perform voice recognition even if a partial phrase is spoken without dictating a site name, a link text, or the entire search words, keywords are extracted from text. In other words, after removing meaningless symbols from the list generated by the content data management unit 110, the user-dictated candidates are extracted in a spacing word unit or a morpheme unit by using morpheme analysis or vocabulary based analysis.

The syntax generator 320 generates a syntax for voice recognition from the keywords extracted from the site list and the link text. In addition, the syntax generator 320 updates the syntax using a search word list corresponding to a category of a current web site.

Figure 4:
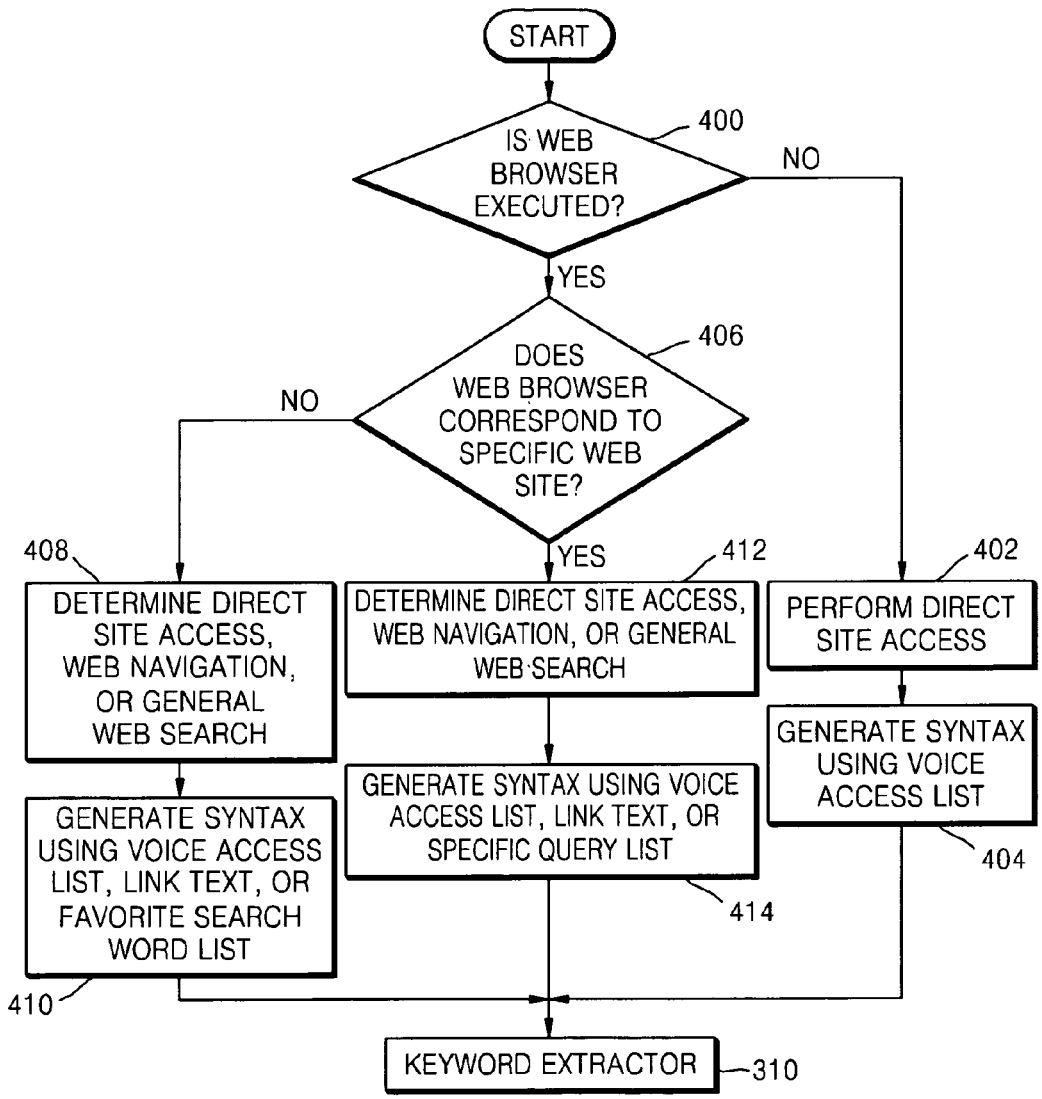
FIG. 4 is a flowchart illustrating a method of extracting a user's intention according to an embodiment of the present invention.

FIG. 4 is a flowchart illustrating a method of extracting a user's intention, according to an embodiment of the present invention.

Referring to FIG. 4, in operation 400, it is determined whether a web browser of a mobile terminal is activated. If it is determined in operation 400 that the web browser is not activated, a possibility that a user speaks voice for a direct site access is high in operation 402, and thus, a syntax is generated with a voice access list in operation 404.

If it is determined in operation 400 that the web browser is activated, a direct web access, a web navigation, and a web search can be performed. It is determined in operation 406 whether the web browser corresponds to a specific web site. In this case, a search word list can be limited according to current web site classification. That is, if a current web site is a field specified site, such as a securities site or a movie site, a search word range can be limited to a search word list specified to a corresponding field, and if the current web site is not a field specified site, the search word range can be limited to a general favorite search word list. If it is determined in operation 406 that the web browser does not correspond to a specific web site, it is determined in operation 408 that a user's intention is a direct site access, a web navigation, or a general web search, and a syntax is generated with the voice access list, a link text, or the favorite search word list in operation 410. If it is determined in operation 406 that the web browser corresponds to a specific web site, it is determined in operation 412 that the user's intention is the direct site access, the web navigation, or a specific web search, and a syntax is generated with the voice access list, the link text, or a specific query list in operation 414. Then, the keyword extractor 310 extracts keywords from the list generated for the syntax generation.

Figure 5:
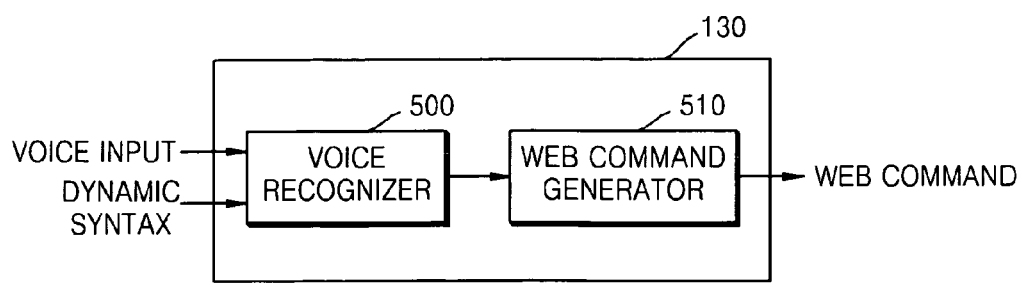
FIG. 5 is a schematic block diagram of a voice analyzer of the apparatus illustrated in FIG. 1, according to an embodiment of the present invention.

FIG. 5 is a schematic block diagram of the voice analyzer 130 of the apparatus 100 illustrated in FIG. 1, according to an embodiment of the present invention.

Referring to FIG. 5, the voice analyzer 130 according to the current embodiment of the present invention includes a voice recognizer 500 and a web command generator 510. The voice analyzer 130 generates a web command by matching user input voice with a generated voice recognition syntax.

The voice analyzer 130 performs voice recognition by applying the syntax generated by the dynamic syntax generator 120 and generates a user web command from the voice recognition result. The voice recognizer 500 searches a list of candidates having high matching scores by performing partial matching between a candidate phonemic stream output from a phoneme detector (not shown) and the syntax and outputs the candidate list as a recognition result. The web command generator 510 generates a web command for performing the user's intention from the voice recognition result. The web command may include direct web access, web navigation, and a web search. A web command for direct web access is replaced with a URL registered for a corresponding site, a web command for web navigation is replaced with a href URL of a link text corresponding to input voice, and a web command for a web search is used to replace a voice query with a search word.

Figure 6:
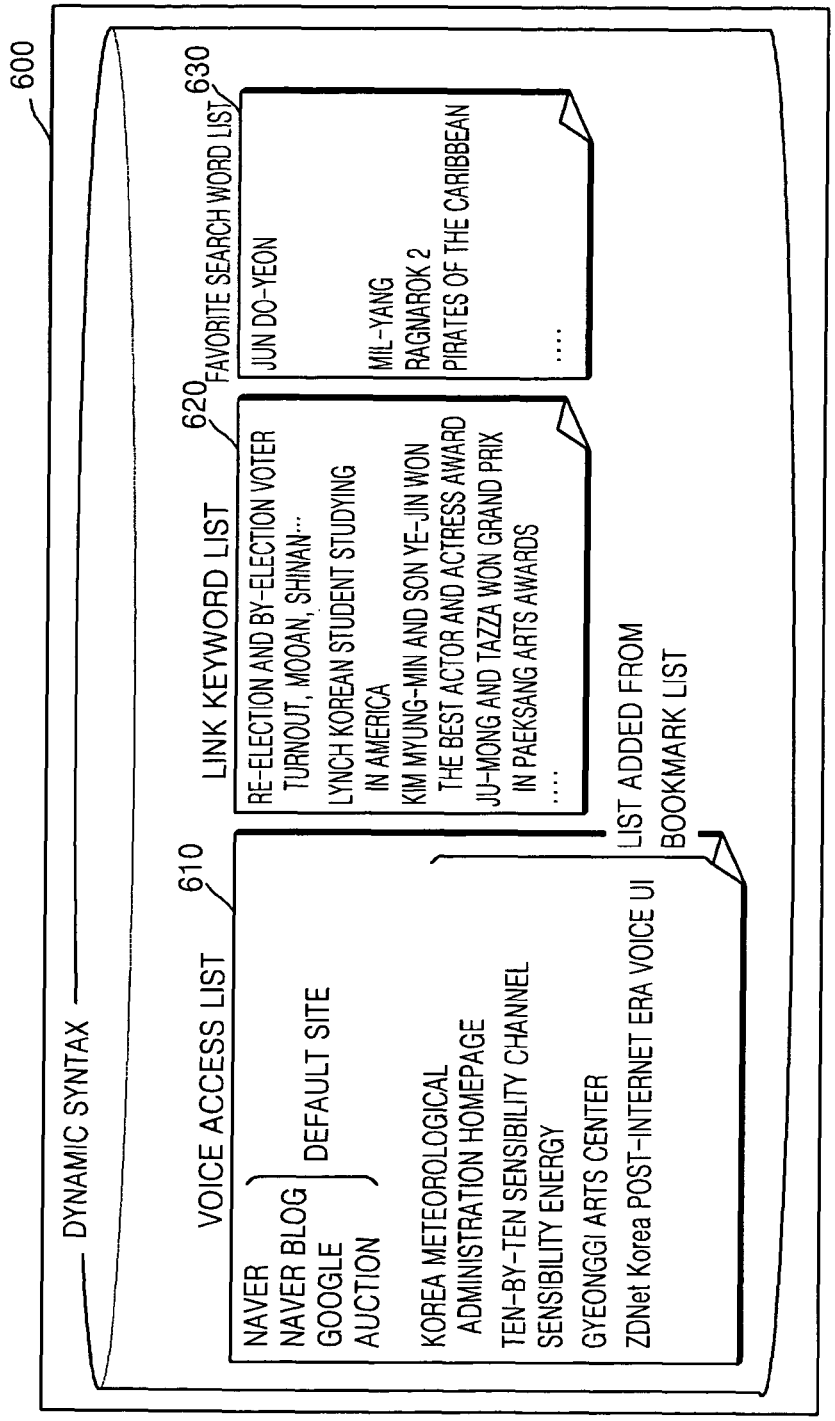
FIG. 6 illustrates a syntax for providing a voice web service, according to an embodiment of the present invention.

FIG. 6 illustrates a syntax 600 for providing a voice web service, according to an embodiment of the present invention.

Referring to FIG. 6, the syntax 600 according to the current embodiment of the present invention is dynamic syntax and includes a voice access list 610, a link keyword list 620, and a favorite search word list 630. The voice access list 610 includes default sites, such as "Naver", "Naver blog", and "Google", and sites added from a bookmark list of favorite sites of the user, e.g., "Korea Meteorological Administration Homepage", "Ten-by-ten sensibility channel energy", etc.

Figure 7:
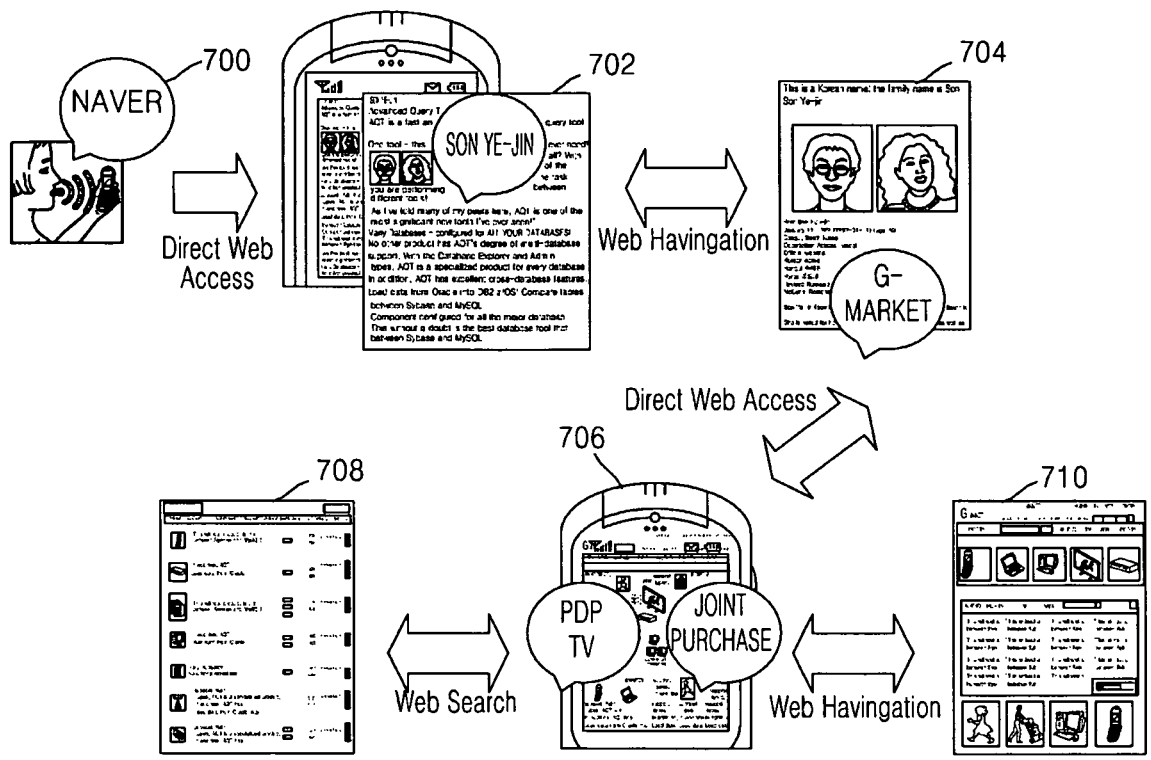
FIG. 7 is a diagram for describing an entire process of providing a voice web service in a mobile terminal, according to an embodiment of the present invention.

FIG. 7 is a diagram for describing an entire process of providing a voice web service in a mobile terminal, according to an embodiment of the present invention.

Referring to FIG. 7, if a user dictates "Naver" to the mobile terminal for a direct web access in operation 700, the mobile terminal accesses a current web site, i.e., the Naver site. If the user dictates "Son Ye-jin" to the mobile terminal for a web navigation while accessing the Naver site in operation 702, the mobile terminal accesses a hyperlink related to "Son Ye-jin" by extracting a link text related to "Son Ye-jin" in the current web site in operation 704. If the user dictates "G-market" to the mobile terminal in a corresponding link page, the mobile terminal opens a G-market site by directly accessing the G-market site in operation 706. If the user dictates "PDP TV" or "joint purchase" to the mobile terminal while accessing the G-market site, the mobile terminal opens a site hyperlinked to PDP TVs or a joint purchase site by means of a web search or a web navigation. Since the currently accessed site, e.g. the G-market site, is a site specified as an Internet shopping site, voice recognition performance can be increased by dynamically constructing a syntax with search words related to shopping.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

As described above, according to the present invention, by performing voice recognition by analyzing a web history of a user from web search logs of the user, generating a voice access list based on the analysis results, and dynamically generating a voice recognition syntax which reflects the generated voice access list, a syntax suitable for a web context of the user can be generated and syntax required for the voice recognition is limited to syntax relating to the web context of the user, and thus, efficient voice recognition, which can be performed in a terminal not in a server, can be implemented.

In addition, by linking a user web log analysis result to syntax generation, a recognition success possibility of a word, which is not previously registered, can be increased, and by recognizing the voice of a user, which is input to a terminal, a voice recognition service independent of a communication network can be provided.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of providing a voice web service in a mobile terminal, the method comprising:
    analyzing a web history of a user, using a processor comprised in the mobile terminal, from web search logs of the user, and generating a voice access list, using the processor, based on a result of the analyzing of the web history of the user;
    generating a voice recognition syntax, using the processor, according to the generated voice access list; and
    generating a web command, using the processor, by matching input voice of the user with the generated voice recognition syntax,
    wherein the voice recognition syntax is generated based on an intention of the user which comprises an operation intended by the user via the input voice of the user.

2. The method of claim 1, wherein the voice access list is generated according to a default site list stored in the mobile terminal of the user and a bookmark list of favorite web sites of the user.

3. The method of claim 1, wherein (a) further comprises:
    classifying a field of a site currently accessed by the mobile terminal, according to a uniform resource locator (URL) of the currently-accessed site, thereby obtaining a site classification result;
    analyzing hypertext markup language (HTML) sources of web content corresponding to the currently-accessed site; and
    extracting a link text for performing a web navigation and a web search in the currently-accessed site from results of analysis of the HTML sources, and
    comprises analyzing a voice input intention of the user using the site classification result and the extracted link text and generating a voice recognition syntax according to the user's intention.

4. The method of claim 3, wherein comprises extracting keywords from the generated voice access list and the extracted link text and generating a voice recognition syntax from the extracted keywords.

5. The method of claim 3, wherein the voice input intention analysis is performed by analyzing at least one of the user's intention of a direct site access, a web navigation, a general web search, and a specific web search according to whether the mobile terminal of the user executes a web browser and whether the mobile terminal accesses a specific web site.

6. A non-transitory computer readable recording medium storing a computer readable program for executing the method of claim 1.

7. An apparatus for providing a voice web service in a mobile terminal, the apparatus comprising:
    a content data management unit, implemented by a processor, configured to analyze a web history of a user from web search logs of the user and configured to generate a voice access list based on a result of analyzing of the web history of the user;
    a dynamic syntax generator, implemented by the processor, configured to generate a voice recognition syntax according to the generated voice access list; and
    a voice analyzer, implemented by the processor, configured to generate a web command by matching input voice of the user with the generated voice recognition syntax,
    wherein the dynamic syntax generator generates the voice recognition syntax based on an intention of the user which comprises and operation intended by the user via the input voice of the user.

8. The apparatus of claim 7, wherein the content data management unit comprises:
    a voice access list generator configured to generate the voice access list using results of analysis obtained by the web search log analyzer.

9. The apparatus of claim 8, wherein the voice access list generator generates the voice access list according to a default site list stored in the mobile terminal of the user and a bookmark list of favorites sites of the user.

10. The apparatus of claim 7, wherein the content data management unit further comprises:
- a web site classifier configured to classify a field of a site currently accessed by the mobile terminal according to a uniform resource locator (URL) of the currently-accessed site, thereby obtaining a site classification result;
- a web content analyzer configured to analyze hypertext markup language (HTML) sources of web content corresponding to the currently-accessed site; and
- a link text extractor configured to extract a link text for performing a web navigation and a web search in the currently-accessed site according to results of analysis performed by the web content analyzer, and the dynamic syntax generator further comprises:
- a user intention analyzer configured to analyze a voice input intention of the user using the site classification result and the extracted link text; and
- a syntax generator to generate a voice recognition syntax according to the user's intention.

11. The apparatus of claim 10, wherein the dynamic syntax generator further comprises a keyword extractor configured to extract keywords from the generated voice recognition list and the extracted link text, and
the syntax generator generates a voice recognition syntax from the extracted keywords.

12. The apparatus of claim 10, wherein the user intention analyzer analyzes at least one of the user's intention of a direct site access, a web navigation, a general web search, and a specific web search according to whether the mobile terminal of the user executes a web browser and whether the mobile terminal accesses a specific web site.

\* \* \* \* \*